United States Patent [19]

Kang

[11] Patent Number: 5,177,786
[45] Date of Patent: Jan. 5, 1993

[54] METHOD AND APPARATUS FOR SCRAMBLING/DESCRAMBLING A VIDEO SIGNAL

[75] Inventor: Kyung J. Kang, Seoul, Rep. of Korea

[73] Assignee: Gold Star Co., Ltd., Seoul, Rep. of Korea

[21] Appl. No.: 693,724

[22] Filed: Apr. 30, 1991

[30] Foreign Application Priority Data

Apr. 30, 1990 [KR] Rep. of Korea ............... 6067/1990

[51] Int. Cl.[5] ........................................... H04N 7/167
[52] U.S. Cl. ....................................... 380/10; 380/14; 380/49; 380/50
[58] Field of Search ................. 380/20, 33, 49, 50, 380/5, 7, 10, 14, 54

[56] References Cited

U.S. PATENT DOCUMENTS

3,958,077  5/1976  Ross et al. ............... 380/14 X
4,531,024  7/1985  Colton et al. ............. 380/10 X
4,776,013 10/1988  Kafri et al. ............... 380/54
4,821,321  4/1989  Bramley ................... 380/54

Primary Examiner—Bernarr E. Gregory
Attorney, Agent, or Firm—John P. White

[57] ABSTRACT

A method and an apparatus for scrambling and descrambling a composite video signal. The method comprises the steps of multiplying a digitalized composite video signal by a transform matrix of a predetermined format in order to bit-scramble them and multiplying the bit-scrambled signals by a matrix of the reverse of said predetermined format to descramble them into original composite video signals. The apparatus comprises a plurality of multiplexers adapted to scramble and descramble the digitized composite video signal in response to external select signals. The external select signals which are applied to the multiplexers of a descrambler 2'S complement signals of signals applied to multiplexers in a scrambler. According to the present method and apparatus, it is possible to prevent any deterioration of the image quality, increase of cost, and illegal watching by non-subscribers.

8 Claims, 5 Drawing Sheets

METHOD AND APPARATUS FOR SCRAMBLING/DESCRAMBLING A VIDEO SIGNAL

BACKGROUND OF THE INVENTION

1. Field of the Invention

The present invention relates to a method and apparatus for scrambling and descrambling a composite video signal, and more particularly to a method and an apparatus for bit-scrambling and again bit-descrambling a digital signal into which the composite video signal is converted thereby.

2. Description of the Prior Art

There have been various systems for scrambling a composite video signal to prohibit illegally watching TV which is supplied by a commercialized system. Among them, there has been used the most generally a line rotation system wherein the scrambled composite video signal is re-scrambled to be descrambled to be the original composite signal. Accordingly, operation principles of a scrambler and a descrambler are basically the same, and thus the operation principle of the descrambler will be described hereinafter only.

Figure 1:
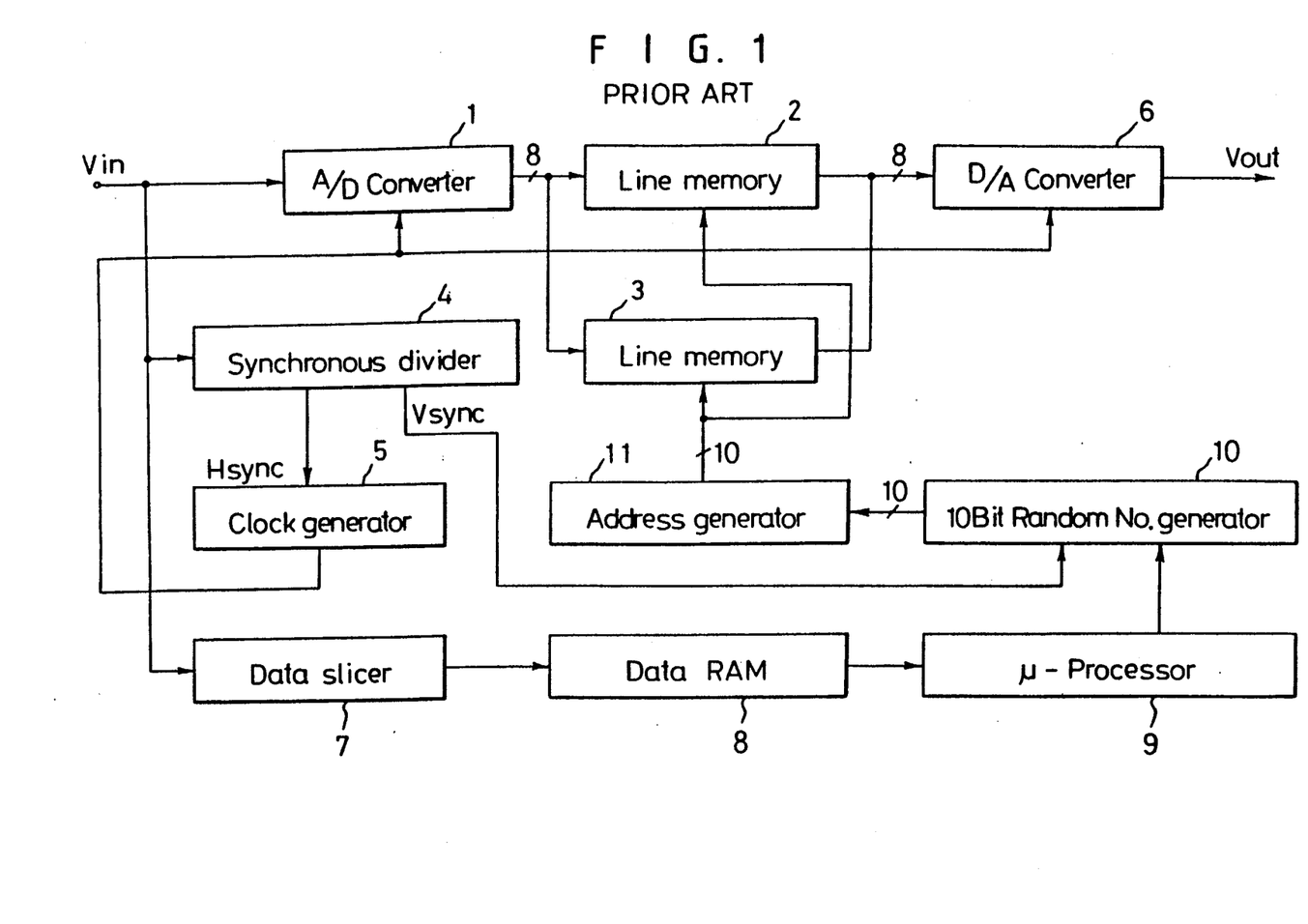
FIG. 1 is a block diagram showing a construction of a conventional descrambler.

The descrambler employed in the above-mentioned conventional line rotation system is shown in FIG. 1. As shown in the drawing, the descrambler comprises an A/D converter 1 adapted to convert a composite video signal Vin inputted therein into 8 bit digital signals; two line memories 2 and 3 adapted to store the digital signals from said converter 1 alternately; a synchronous divider 4 adapted to divide said composite video signal Vin inputted therein into a horizontal synchronizing signal $H_{sync}$ and a vertical synchronizing signal $V_{sync}$; a clock generator 5 adapted to generate a sampling clock in response to said horizontal synchronizing signal $H_{sync}$ from said synchronous divider 4 to apply said sampling clock to said A/D converter 1; a D/A converter 6 adapted to receive and convert the digital signals from said line memories 2 and 3 into an analog signal and to receive the sampling clock from said clock generator 5; a data slicer 7 adapted to extract from said composite video signal Vin initial data coded during a vertical blanking interval VBI thereof for each field thereof in order to generate random numbers; a data RAM 8 adapted to store the coded initial data from said date slicer 7; a microprocessor 9 adapted to decode said coded initial data stored in said data RAM 8; a 10 bit random number generator 10 adapted to receive said vertical synchronizing signal $V_{sync}$ from said synchronous divider 4 and the decoded initial data from said microprocessor 9 and generate 10 bit random numbers; and an address generator 11 adapted to receive output signals from said 10 bit random number generator 10 and apply address signals to the line memories 2 and 3.

The operation of the descrambler with the above-mentioned construction will now be described.

Figure 2A:
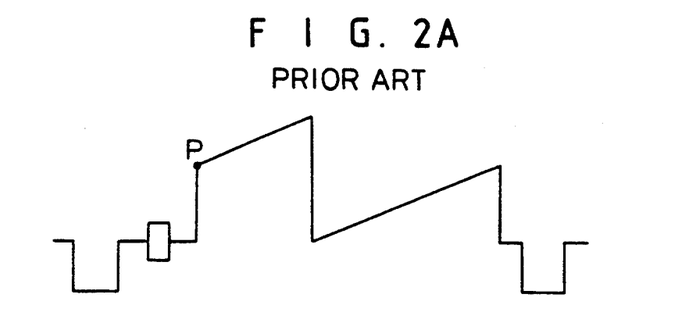
FIG. 2A is a waveform diagram of a composite video signal scrambled by a conventional scrambler.

As shown in FIG. 2A, upon receiving a scrambled composite video signal Vin, the A/D converter 1 converts it into 8 bit digital signals and sends the digital signals out to the line memories 2 and 3 alternately. The line memories 2 and 3 which receive the 8 bit digital signals store them alternately in response to address signals from the address generator 11 and send said stored digital signals out to the D/A converter 6. The D/A converter 6 converts the received digital signals into an analog signal and generates a descrambled composite video signal Vout which is the same as the original composite video signal, as shown in FIG. 2B.

Figure 2B:
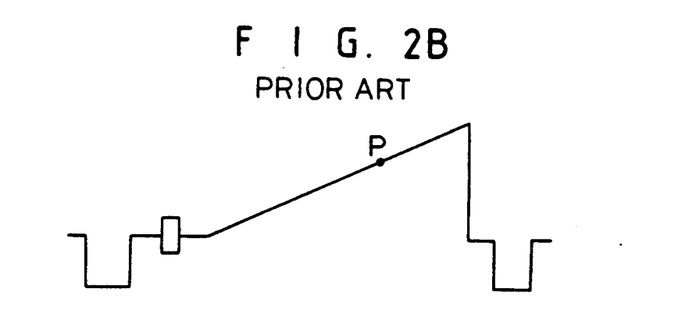
FIG. 2B is a waveform diagram of the composite video signal descrambled by the conventional descrambler.

It is noted that address values for the line memories 2 and 3 correspond to a point P shown in FIG. 2B.

A signal of waveform shown in FIG. 2A is scrambled about the point P corresponding to the address values. Accordingly, if a 10 bit random number generator in the scrambler (not shown) which is the same as the 10 bit random number generator 10 generates address values corresponding to the point P on each line randomly, an image from such scrambled video signal can not be recognized at all, like a noise image on screen.

On the other hand, the above-mentioned random number generator of the scrambler as a transmitter transmits the scrambled composite video signal carried with initial data coded during the vertical blanking interval thereof for each field thereof. Accordingly, the data slicer 7 receives the scrambled composite video signal Vin and extracts the coded initial data which is in turn stored into the data RAM 8. The microprocessor 9 decodes the coded initial data stored in the data RAM 8 and supplies it to the 10 bit random number generator 10 as a control signal to control it. Therefore, the value of the point P generated in the scrambler as a transmitter is read precisely by the descrambler as a receiver. This is possible because the scrambler as a transmitter and the descrambler as a receiver have the same construction including the 10 bit random number generator 10 so that if initial data values provided for each field are the same in both devices then the values of the point P generated at each horizontal scanning line are the same in both devices. The generated value for the point P is supplied to the address generator 11 which in turn supplies address signals to the line memories 2 and 3 in order to read a data signal stored in the line memories 2 and 3 as shown in FIG. 2A, as a data signal as shown in FIG. 2B. The reason why two line memories 2 and 3 are used is to perform read and write operations on alternate horizontal lines alternately. Also, the A/D converter 1 and the D/A converter 6 are intended for use of 8 bits and samples of 1024 per horizontal line (10 address lines), although not limited thereto.

In the above conventional construction, however, if the address value for the point P is generated by the random number generator, as above-mentioned, a certain point during the video signal interval corresponding to the point P is cut out and the composite video signal is scrambled about the point P in a line rotation manner. At the cut part of the video signal, a high frequency noise component to be noise is generated. This it results in degrading image quality at the cut part. In addition, there is a disadvantage of expensive manufacture cost which is caused the use of expensive two line memories. Furthermore, it can not prohibit the non-subscribers from watching illegally, because the composite video signal is simply scrambled by using two line memories.

SUMMARY OF THE INVENTION

Therefore, it is an object of the present invention to provide a method and apparatus for scrambling and descrambling a digitalized composite video signal by using a transform matrix. It is another object of the present invention to provide a method and apparatus for scrambling and descrambling the digitalized composite video signal which is capable of avoiding any deterioration of the image quality, increase of cost, and illegal watching by non-subscribers.

In accordance with one aspect of the present invention, there is provided an apparatus for scrambling a video signal comprising an A/D converter for receiving a composite video signal to be bit-scrambled from an external equipment and converting the composite video signal into a digital signal for bit-scrambling; a multiplexing means, for inputting the digital signal from said A/D converter and multiplexing the digital signal in response to an external select signal; a D/A converter for receiving the multiplexed digital signal from said multiplexing means and converting the multiplexed digital signal into an analog signal; a synchronous divider for receiving said composite video signal and dividing the composite video signal into a vertical synchronizing signal and a horizontal synchronizing signal; a clock generator for receiving the horizontal synchronizing signal from said synchronous divider to generate a clock signal and supplying the clock signal to said A/D converter and said D/A converter; an initial data generating means for receiving said composite video signal, extracting from said composite video signal initial data coded during a vertical blanking interval thereof for each field thereof, and decoding the extracted coded initial data; a horizontal blanking interval detector for receiving the horizontal synchronizing signal from said synchronous divider, detecting a horizontal blanking interval from said horizontal synchronizing signal, and outputting a low signal during the detected horizontal blanking interval; a random number generator for generating random numbers of a predetermined number of bits, upon receiving the vertical synchronous signal from said synchronous divider and the decoded initial data from said initial data generating means; and an AND logic operating means including a plurality of AND gates were each gate has its one input terminal for receiving each bit signal from said random number generator, and the other input terminal for receiving an output signal from said horizontal blanking interval detector, its output terminal coupled in common to said multiplexing means for applying said external select signal.

In accordance with another aspect of the present invention, there is provided an apparatus for descrambling a video signal comprising an A/D converter for receiving a scrambled composite video signal to be descrambled and converting the composite video signal into a digital signal for descrambling; a multiplexing means for inputting the digital signal from said A/D converter and multiplexing the digital signal in response to an external select signal; a D/A converter for receiving the multiplexed digital signal from said multiplexing means and converting the multiplexed digital signal into an analog signal; a synchronous divider for receiving said composite video signal and dividing the composite video signal into a vertical synchronizing signal and a horizontal synchronizing signal; a clock generator for receiving the horizontal synchronizing signal from said synchronous divider to generate a clock signal and supplying the clock signal to said A/D converter and said D/A converter; an initial data generating means for receiving said composite video signal, extracting from said composite video signal initial data coded during a vertical blanking interval thereof for each field thereof, and decoding the extracted coded initial data; a horizontal blanking interval detector for receiving the horizontal synchronizing signal from said synchronous divider, detecting a horizontal blanking interval from said horizontal synchronizing signal, and outputting a low signal during the detected horizontal blanking interval; a random number generator for generating random numbers of a predetermined number of bits upon receiving the vertical synchronizing signal from said synchronous divider and the decoded initial data from said initial data generating means; a 2'S complement converter for complementing each bit signal from said random number generator; and an AND logic operating means including a plurality of AND gates were each gate has one input terminal for receiving each complemented bit signal from said 2'S complement converter, and the other input terminal for receiving an output signal from said horizontal blanking interval detector, its output terminal coupled in common to said multiplexing means for applying said external select signal.

In accordance with still another aspect of the present invention, there is provided a method of scrambling/descrambling a video signal comprising the steps of; converting a composite video signal into digital signals of a predetermined number of bits and multiplying the digital signals by a transform matrix of a predetermined format to bit-scramble them; converting said bit-scrambled digital signals to an analog signal and transmitting the analog-converted signal to a user station; re-converting said analog-converted signal into digital signals of said predetermined number of bits and multiplying the digital signals by a transform matrix of the reverse of said predetermined format to descramble them; and converting said descrambled digital signals to an original composite video signal.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF PREFERRED EMBODIMENT

Figure 3:
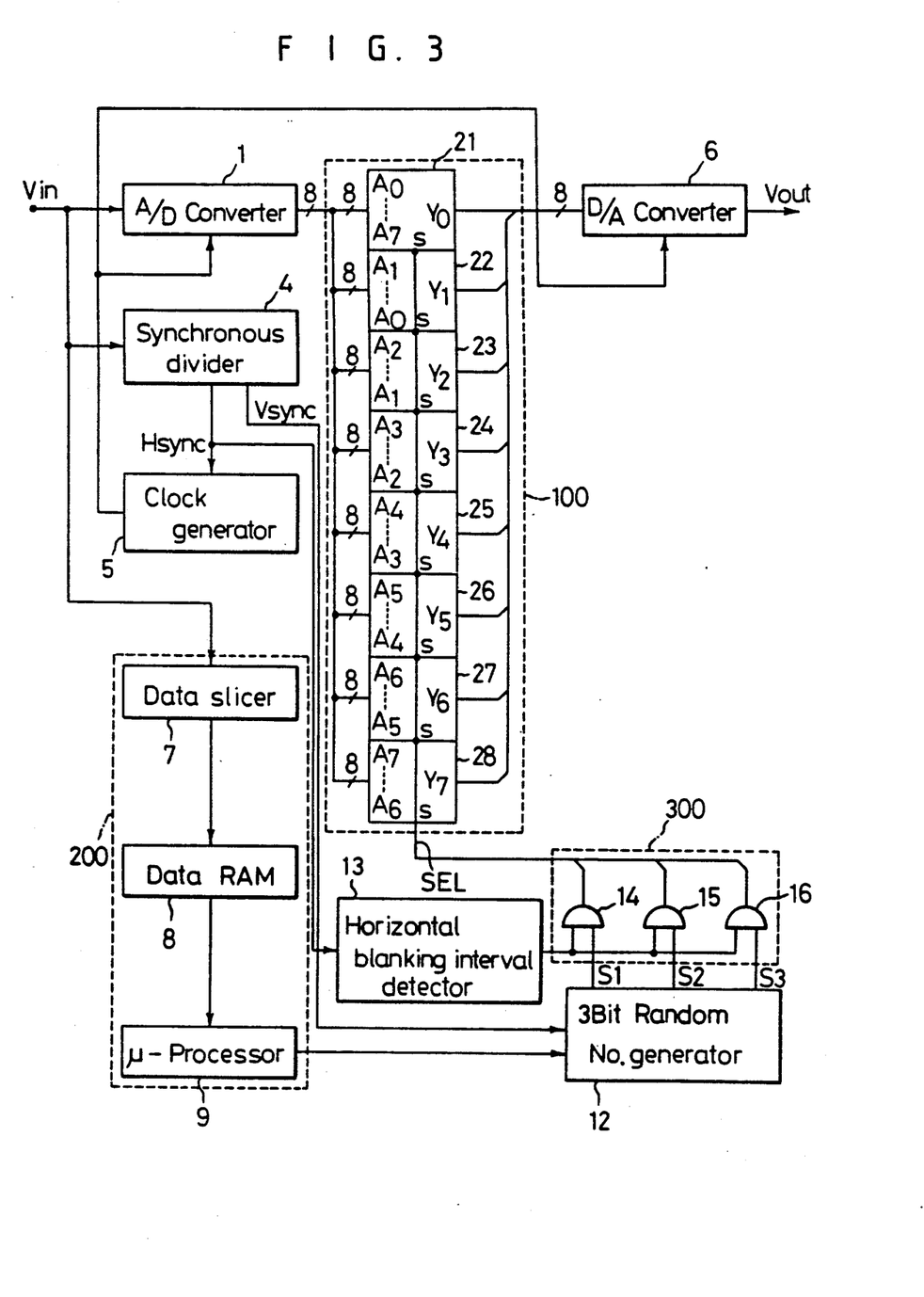
FIG. 3 is a block diagram showing a construction of an embodiment of a scrambler according to the present invention.

Referring now to FIG. 3, a scrambler in accordance with an embodiment of the present invention is shown to comprise an A/D converter 1 which receives a composite video signal Vin from an external equipment and converts the composite video signal into 8 bit digital signals A0-A7. Also, the scrambler comprises a synchronous divider 4, a clock generator 5, a multiplexing means 100, a D/A converter 6, a horizontal blanking interval detector 13, an initial data generating means 200, a 3 bit random number generator 12 and an AND logic operating means 300.

The synchronous divider 4 receives the composite video signal Vin from the external equipment and divides the composite video signal into a vertical synchronizing signal $V_{sync}$ and a horizontal synchronizing signal $H_{sync}$ which are to be sent out to the 3 bit random number generator 12; and the clock generator 5 and the horizontal blanking interval detector 13, respectively.

The clock generator 5 receives the horizontal synchronizing signal $H_{sync}$ from the synchronous divider 4 to generate a clock signal and supplies the clock signal to the A/D converter 1 and D/A converter 6.

The multiplexing means 100 comprises 8 8×1 multiplexers 21 through 28 which input simultaneously the 8 bit digital signals A0-A7 from the A/D converter 1. Each of the 8×1 multiplexers 21 through 28 outputs a 1-bit digital signal Y0-Y7 of the 8 bit digital signals A0-A7 to the D/A converter 6 in response to a 3 bit external select signal SEL from the AND logic operating means 300.

The D/A converter 6 receives the 1 bit digital signal from each of the 8×1 multiplexers 21 through 28, the total 8 bit digital signals and converts the 8 bit digital signals into a scrambled analog signal.

The horizontal blanking interval detector 13 detects a horizontal blanking interval from the horizontal synchronizing signal from the synchronous divider 4, so that it outputs a "low" signal during the detected horizontal blanking interval and a "high" signal during the remaining interval.

The initial data generating means 200 receives the composite video signal Vin from the external equipment, extracts from the composite video signal Vin initial data coded during a vertical blanking interval thereof for each field thereof and decodes the extracted coded initial data. Then, the decoded initial data from the initial data generating means 200 is sent out to the 3 bit random number generator 12.

Upon receiving the vertical synchronizing signal $V_{sync}$ from the synchronous divider 4 and the decoded initial data from the initial data generating means 200, the 3 bit random number generator 12 generates 3 bit random numbers.

The AND logic operating means 300 comprises 3 AND gates 14 through 16 were each gate has its one input terminal receiving 3 bit signals S1-S3 from the 3 bit random number generator 12 and the other input terminal receiving an output signal from the horizontal blanking interval detector 13. An output terminal of each of the AND gates 14 through 16 is coupled in common to the 8×1 multiplexers 21 through 28 to apply the external select signal SEL.

Also, the initial data generating means 200 comprises a data slicer 7 for extracting from the composite video signal Vin the initial data coded during the vertical blanking interval thereof for each field thereof, a data RAM 8 for storing the coded initial data from the data slicer 7, and a microprocessor 9 for decoding the coded initial data stored in the data RAM 8 and sending the decoded initial data out to the 3 bit random number generator 12.

Figure 4:
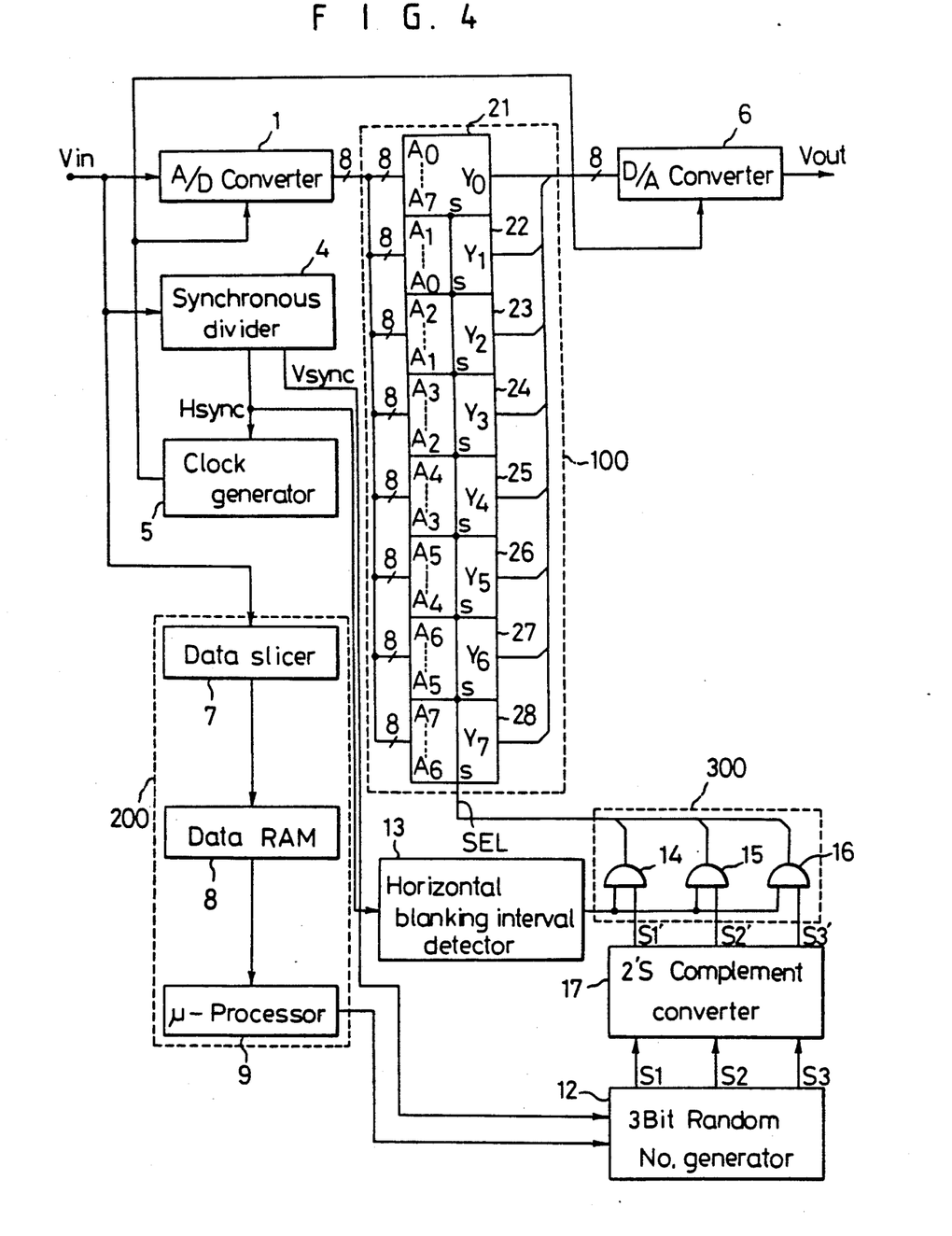
FIG. 4 is a block diagram showing a construction of an embodiment of a descrambler according to the present invention.

FIG. 4 is a block diagram showing partially a construction of an embodiment of a descrambler according to the present invention. This drawing is identical to the FIG. 3, except that there is shown a 2'S complement converter 17 connected between the output stage of the 3 bit random number generator 12 and the one input stage of AND gates 14 through 16 in the AND logic operating means 300. For this reason, 3 bit complement signals S1'-S3' on the 3 bit signals S1-S3 from the 3 bit random number generator 12 are received at the one input stage of AND gates 14 through 16, differently from the scrambler of the present invention.

As described above, the construction of the descrambler in FIG. 4 is identical to that of the scramble in FIG. 3, but that it comprises the 2'S complement converter 17 connected between the output stage of the 3 bit random number generator 12 and the one input stage of AND gates 14 through 16 in the AND logic operating means 300. The 2'S complement converter 17 performs complementing on the 3 bit signals S1-S3 from the 3 bit random number generator. Therefore, from the 2'S complement converter 17, the 3 bit complement signals S1'-S3' 12 on the 3 bit signals S1-S3 are sent out to the one input stage of AND gates 14 through 16, thereby allowing the external select signal SEL of the 2'S complement from the AND gates 14 through 16 in the AND logic operating means 300 to be applied to the multiplexing means 100.

Therefore, only the operation of the scrambler will be hereinafter described in detail.

First, when the original composite video signal Vin is converted into the 8 bit digital signals by the A/D converter 1, the 8 bit digital signals from the A/D converter 1 are inputted by the 8 8×1 multiplexers 21 through 28 simultaneously. Then, each of the 8×1 multiplexers 21 through 28 outputs the 1 bit digital signal of the 8 bit digital signals to the D/A converter 6 in response to the 3 bit external select signal SEL from the AND logic operating means 300. Finally, D/A converter 6 receives the 1 bit digital signal from each of the 8×1 multiplexers 21 through 28, the total 8 bit digital signals and converts the 8 bit digital signals into the scrambled analog signal. As a result, the scrambled analog signal can be outputted from the D/A converter 6.

On the other hand, the synchronous divider 4 receives the composite video signal Vin from the external equipment, together with the A/D converter 1, and divides the composite video signal into vertical synchronizins signal $V_{sync}$ and horizontal synchronous signal H which then is sent out to the clock generator 5 and the horizontal blanking interval detector 13.

Upon receiving the horizontal synchronizing signal $H_{sync}$ from the synchronous divider 4, the clock generator 5 generates a clock signal and applies it to the A/D converter 1 and the D/A converter 6. The horizontal blanking interval detector 13 detects the horizontal blanking interval from the horizontal synchronizing signal and applies a low signal to the other input terminals of respective AND gates 14 to 16 in the AND logic operating means 300 during the horizontal blanking interval. This is for the purpose of maintaining all outputs of the AND logic operating means 300 at low level state during the horizontal blanking interval, because this interval contains the horizontal synchronizing signal, a color burst signal, a front porch and a back porch and needs no scrambling.

Also, the data slicer 7 in the initial data generating means 200 receives the composite video signal Vin which also is applied to the A/D converter 1 and the synchronous divider 4 and extracts from the composite video signal Vin the initial data coded during the vertical blanking interval thereof for each field thereof in order to store it into the data RAM 8. The microprocessor 9 decodes the coded initial data stored in the data RAM 8 and sends the decoded initial data out to the 3 bit random number generator 12. The 3 bit random number generator 12 outputs 3 bit random numbers in response to the inputted initial data and the inputted vertical synchronizing signal $V_{sync}$ from the synchronous divider 4. Then, AND gates 14 to 16 in the AND logic operating means 300 receive 3 bit signals S1 to S3 as respective one input signals, respectively, and also receive an output signal from the horizontal blanking interval detector 13 as a common other input signal. The AND gates 14 to 16 operate on the inputted signals and to output a 3 bit signal to the multiplexing means 100 as an external select signal, respectively.

Now, the operation by the construction of the scrambler as shown in FIG. 3 will be described with reference to the accompanying matrix formats.

The following table 1 shows a transform matrix format when a composite video signal is converted into 8 bit digital signals.

TABLE 1

$$T_{jk} = \begin{bmatrix} t11 & t12 & t13 & t14 & t15 & t16 & t17 & t18 \\ t21 & t22 & t23 & t24 & t25 & t26 & t27 & t28 \\ t31 & t32 & t33 & t34 & t35 & t36 & t37 & t38 \\ t41 & t42 & t43 & t44 & t45 & t46 & t47 & t48 \\ t51 & t52 & t53 & t54 & t55 & t56 & t57 & t58 \\ t61 & t62 & t63 & t64 & t65 & t66 & t67 & t68 \\ t71 & t72 & t73 & t74 & t75 & t76 & t77 & t78 \\ t81 & t82 & t83 & t84 & t85 & t86 & t87 & t88 \end{bmatrix}$$

The procedure that the multiplexing means 100 is bit-scrambling digital signals from the A/D converter 1 in response to the external select signal SEL from the AND logic operating means 300 can be defined by the following transform matrix equation 1:

$$\pi_n = \begin{bmatrix} T_{j,Ra(j+n)} = 1 \\ \text{Others} = 0 \end{bmatrix} \quad (1)$$

where, n is a random positive integer including zero, a is a bit number of the A/D converted composite video signal, j is a positive integer from 1 to a, and Ra(j+n) is the remainder when j+n was divided by a (optionally, a when the remainder is zero).

Several examples obtained by applying the matrix equation 1 to the transform matrix format table 1 can be expressed as transform matrix format tables 2 through 4 as follows:

TABLE 2

$$\begin{bmatrix} Y0 \\ Y1 \\ Y2 \\ Y3 \\ Y4 \\ Y5 \\ Y6 \\ Y7 \end{bmatrix} = \begin{bmatrix} 1 & 0 & 0 & 0 & 0 & 0 & 0 & 0 \\ 0 & 1 & 0 & 0 & 0 & 0 & 0 & 0 \\ 0 & 0 & 1 & 0 & 0 & 0 & 0 & 0 \\ 0 & 0 & 0 & 1 & 0 & 0 & 0 & 0 \\ 0 & 0 & 0 & 0 & 1 & 0 & 0 & 0 \\ 0 & 0 & 0 & 0 & 0 & 1 & 0 & 0 \\ 0 & 0 & 0 & 0 & 0 & 0 & 1 & 0 \\ 0 & 0 & 0 & 0 & 0 & 0 & 0 & 1 \end{bmatrix} \times \begin{bmatrix} A0 \\ A1 \\ A2 \\ A3 \\ A4 \\ A5 \\ A6 \\ A7 \end{bmatrix}$$

TABLE 3

$$\begin{bmatrix} Y0 \\ Y1 \\ Y2 \\ Y3 \\ Y4 \\ Y5 \\ Y6 \\ Y7 \end{bmatrix} = \begin{bmatrix} 0 & 0 & 0 & 1 & 0 & 0 & 0 & 0 \\ 0 & 0 & 0 & 0 & 1 & 0 & 0 & 0 \\ 0 & 0 & 0 & 0 & 0 & 1 & 0 & 0 \\ 0 & 0 & 0 & 0 & 0 & 0 & 1 & 0 \\ 0 & 0 & 0 & 0 & 0 & 0 & 0 & 1 \\ 1 & 0 & 0 & 0 & 0 & 0 & 0 & 0 \\ 0 & 1 & 0 & 0 & 0 & 0 & 0 & 0 \\ 0 & 0 & 1 & 0 & 0 & 0 & 0 & 0 \end{bmatrix} \times \begin{bmatrix} A0 \\ A1 \\ A2 \\ A3 \\ A4 \\ A5 \\ A6 \\ A7 \end{bmatrix}$$

TABLE 4

$$\begin{bmatrix} A0 \\ A1 \\ A2 \\ A3 \\ A4 \\ A5 \\ A6 \\ A7 \end{bmatrix} = \begin{bmatrix} 0 & 0 & 0 & 0 & 0 & 1 & 0 & 0 \\ 0 & 0 & 0 & 0 & 0 & 0 & 1 & 0 \\ 0 & 0 & 0 & 0 & 0 & 0 & 0 & 1 \\ 1 & 0 & 0 & 0 & 0 & 0 & 0 & 0 \\ 0 & 1 & 0 & 0 & 0 & 0 & 0 & 0 \\ 0 & 0 & 1 & 0 & 0 & 0 & 0 & 0 \\ 0 & 0 & 0 & 1 & 0 & 0 & 0 & 0 \\ 0 & 0 & 0 & 0 & 1 & 0 & 0 & 0 \end{bmatrix} \times \begin{bmatrix} Y0 \\ Y1 \\ Y2 \\ Y3 \\ Y4 \\ Y5 \\ Y6 \\ Y7 \end{bmatrix}$$

The table 2 shows a transform matrix format of $\Upsilon = \pi_0 \textit{A}$ where all the bit signals outputted from the 3 bit random number generator 12 are zero (S1=S2=S3=0, that is n=0), the matrix format of the composite video signal digitized by the A/D converter is indicated as , the matrix format of the bit-scrambled signals outputted from the multiplexing means 100 is indicated as $\Upsilon$, and the value of a is 8.

The table 3 shows a transform matrix format of $\Upsilon = \pi_3 \textit{A}$ where the random positive integer "n" in the matrix equation 1 is 3.

The table 4 shows a transform matrix format of the descrambled state where the random positive integer in the matrix equation (1) is 3. The external select signal SEL can be obtained by the signals outputted from the 3 bit random number generator 12 and then complemented by the 2'S complement converter 17 as shown in FIG. 4, thus the matrix format of the digitized composite video signal can be expressed as $\textit{A} = \pi_n{}' \Upsilon = \pi_{8-3} \Upsilon$. The table 4 can be obtained by substituting the above equations $\textit{A} = \pi_n{}' \Upsilon = \pi_{8-3} \Upsilon$ for the matrix equation (1).

In case of n=3, the first term of the scrambled matrix format table 3 can be expressed as:

$$Y0 = 0 \cdot A0 + 0 \cdot A1 + 0 \cdot A2 \cdot 1 \cdot A3 + \ldots + 0 \cdot A7 = A3$$

Also, in case of n=3, the fourth term of the descrambled matrix format table 4 can be expressed as:

$$A3 = 1 \cdot Y0 + 0 \cdot Y1 + 0 \cdot Y2 + 0 \cdot Y3 + \ldots + 0 \cdot Y7 = Y0$$

Therefore, it is well known that a certain signal descrambled by a transform matrix format such as equation (1) can be rescrambled by an alternative transform matrix of the reverse format of said matrix resulting in its return to its original composite video signal.

On the other hand, the scrambler as a transmitter generally transmits the scrambled composite video signal carried with initial data coded during the vertical blanking interval thereof for each field thereof for preventing the non-subscriber from descrambling the video signal.

In the scrambler, the coded initial data is extracted by the data slicer 7 in the initial data generating means 200, stored in the data RAM 8, then decoded by the microprocessor 9.

Thereafter, the decoded initial data is sent out to the 3 bit random number generator 12 every frame as a signal for controlling the 3 bit random number generator 12.

Accordingly, a non-subscriber who is not notified of information about the coded initial data can not descramble the scrambled video signal because he does not recognize the contents of the 3 bit signals S1-S3 from the 3 bit random number generator 12.

Also, it is possible to take a case of n=0,1,7 in the transform matrix equation(1) into consideration in order to simplify the construction of the 8 multiplexers 21 through 28 in the multiplexing means 100. In other words, the scrambler and the descrambler can have such constructions as shown in FIG. 5, in consideration of cases of $\pi_0$, $\pi_1$, $\pi_7$.

Figure 5:
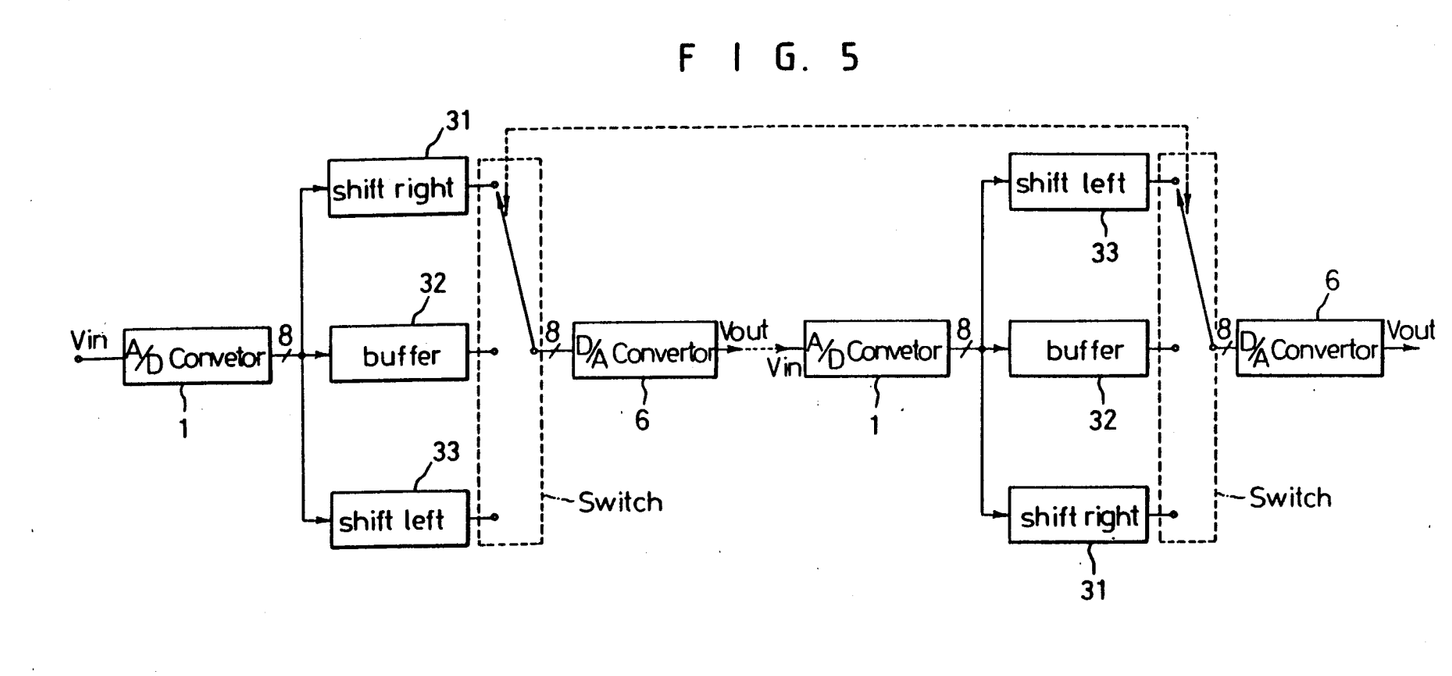
FIG. 5 is a block diagram showing a construction of alternative embodiment of the scrambler and the descrambler according to the present invention.

In case of $\pi_0$, in the scrambler, the 8 8×1 multiplexers 21 through 28 in FIG. 3 can be replaced by a buffer 32 in FIG. 5, also in case of $\pi_1$, the multiplexers 21 through 28 can be replaced by a first shift register 31 shifting the digital signal to the right, 1 bit, and in case of $\pi_7$, the multiplexers 21 through 28 can be replaced by a second shift register 33 shifting digital signal to the left, 1 bit.

As above-mentioned, the scrambler and the descrambler in accordance with the present invention can provide advantages as follows:

First, they reduce cost because there is no need to provide the two line memories which have been required to provide for the conventional apparatus;

Second, they can prevent the image quality from being degraded because the cutting at the random point of the horizontal scanning line for scrambling is not needed.

Although the preferred embodiments of the present invention have been disclosed for illustrative purpose, those skilled in the art will appreciate that various modifications, additions and substitutions are possible, without departing from the scope and spirit of the invention as disclosed in the accompanying claims.

What is claimed is:

1. An apparatus for scrambling a video signal comprising:
   an A/D converter for receiving a composite video signal and for converting the composite video signal into a digital signal for bit-scrambling;
   a multiplexing means for receiving the digital signal from said A/D converter and for multiplexing the digital signal in response to an external select signal;
   a D/A converter for receiving the multiplexed digital signal from said multiplexing means and for converting the multiplexed digital signal into an analog signal;
   a synchronous divider for receiving said composite video signal and for dividing the composite video signal into a vertical synchronizing signal and a horizontal synchronizing signal;
   a clock generator for receiving the horizontal synchronizing signal from said synchronous divider to generate a clock signal and for supplying the clock signal to said A/D converter and said D/A converter;
   an initial data generating means for receiving said composite video signal, for extracting from said composite video signal initial data coded during a vertical blanking interval thereof for each field thereof, and for decoding the extracted coded initial data;
   a horizontal blanking interval detector for receiving the horizontal synchronizing signal from said synchronous divider, for detecting a horizontal blanking interval from said horizontal synchronizing signal, and for outputting a low signal during the detected horizontal blanking interval;
   a random number generator for generating pseudorandom numbers of a predetermined number of bits, upon receiving the vertical synchronizing signal from said synchronous divider and the decoded initial data from said initial data generating means; and
   an AND logic operating means including a plurality of AND gates where each gate has a first input terminal for receiving each bit signal from said random number generator, a second input terminal for receiving an output signal from said horizontal blanking interval detector and an output terminal coupled in common to said multiplexing means for applying said external select signal.

2. An apparatus for scrambling a video signal as claimed in claim 1, wherein said initial data generating means includes a data slicer for extracting from said composite video signal said initial data coded during the vertical blanking interval thereof for each field thereof, a data RAM for storing said coded initial data from said data slicer, and a microprocessor for decoding said coded initial data stored in said data RAM and for sending the decoded initial data out to said random number generator.

3. An apparatus for scrambling a video signal as claimed in claim 1, wherein said multiplexing means includes a first shift register for shifting the digital signal from said A/D converter to the right, a buffer for buffering the digital signal from said A/D converter, a second shift register for shifting the digital signal from said A/D converter to the left, and a switch responsive to said external select signal for selecting the shifted digital signal from said first shift register or said second shift register or for selecting said stored digital signal from said buffer.

4. An apparatus for descrambling a video signal comprising;
   an A/D converter for receiving a scrambled composite video signal and for converting the composite video signal into a digital signal for descrambling;
   a multiplexing means for receiving the digital signal from said A/D converter and for multiplexing the digital signal in response to an external select signal;
   a D/A converter for receiving the multiplexed digital signal from said multiplexing means and for converting the multiplexed digital signal into an analog signal;
   a synchronous divider for receiving said composite video signal and for dividing the composite video signal into a vertical synchronizing signal and a horizontal synchronizing signal;
   a clock generator for receiving the horizontal synchronizing signal from said synchronous divider to generate a clock signal and for supplying the clock signal to said A/D converter and said D/A converter;

an initial data generating means for receiving said composite video signal, for extracting from said composite video signal initial data coded during a vertical blanking interval thereof for each field thereof, and for decoding the extracted coded initial data;

a horizontal blanking interval detector for receiving the horizontal synchronizing signal from said synchronous divider, for detecting a horizontal blanking interval from said horizontal synchronizing signal, and for outputting a low signal during the detected horizontal blanking interval;

a random number generator for generating pseudo-random numbers of a predetermined number of bits, upon receiving the vertical synchronizing signal from said synchronous divider and the decoded initial data from said initial data generating means;

a 2'S complement converter for complementing each bit signal from said random number generator; and an AND logic operating means including a plurality of AND gates where each gate has a first input terminal for receiving each complemented bit signal from said 2'S complement converter, a second input terminal for receiving an output signal from said horizontal blanking interval detector and an output terminal coupled in common to said multiplexing means for applying said external select signal.

5. An apparatus for descrambling a video signal as claimed in claim 4, wherein said initial data generating means includes a data slicer for extracting from said composite video signal said initial data coded during the vertical blanking interval thereof for each field thereof, a data RAM for storing said coded initial data from said data slicer, and a microprocessor for decoding said coded initial data stored in said data RAM and for sending the decoded initial data out to said random number generator.

6. An apparatus for descrambling a video signal as claimed in claim 4, wherein said multiplexing means includes a first shift register for shifting the digital signal from said A/D converter to the left, a buffer for buffering the digital signal from said A/D converter, a second shift register for shifting the digital signal from said A/D converter to the right, and a switch responsive to said external select signal for selecting the shifted digital signal from said first shift register or said second shift register or for selecting said stored digital signal from said buffer.

7. A method of scrambling, transmitting and descrambling a video signal comprising the steps of:
converting a composite video signal into digital signals of a predetermined number of bits and multiplying the digital signals by a transform matrix of a predetermined format to bit-scramble them;
converting said bit-scrambled digital signals to an analog signal and transmitting the analog-converted signal to a user station;
re-converting said analog-converted signal into digital signals of said predetermined number of bits and multiplying the digital signals by an alternative transform matrix of the reverse of said predetermined format to descramble them; and
converting said descrambled digital signals to an original composite video signal.

8. A method for scrambling, transmitting and descrambling a video signal as claimed in claim 7, wherein said transform matrix is defined by $\pi_n$ expressed by the equations:

$$\pi_n = T_{j,k} = \begin{bmatrix} 1, & \text{where} & k = Ra(j+n) \\ 0, & \text{where} & k \neq Ra(j+n) \end{bmatrix}$$

such that:

$$Y = \pi_n A; \text{ and}$$

$$A = \pi_{a-n} Y;$$

where:
$Y$ = a matrix of the bit-scrambled digitized signal;
$A$ = a matrix of the digitalized signal;
$a$ = the predetermined number of bits in said digitized signal;
$j$ = positive integer from 1 to a;
$k$ = positive integer from 1 to a;
$n$ = random positive integer including zero;
$Ra(j+n)$ = the remainder of $(j+n)/a$, but, when the remainder is zero, $Ra(j+n) = a$.

* * * * *